Feb. 15, 1938.     M. LOW     2,108,071
METHOD OF AND APPARATUS FOR SHAPING PLASTIC MATERIALS
Original Filed July 9, 1934    7 Sheets-Sheet 1

Fig.1.

Inventor
Marshall Low

Feb. 15, 1938.                M. LOW                    2,108,071
         METHOD OF AND APPARATUS FOR SHAPING PLASTIC MATERIALS
               Original Filed July 9, 1934    7 Sheets-Sheet 2

Inventor
Marshall Low

Feb. 15, 1938.　　　　M. LOW　　　　2,108,071
METHOD OF AND APPARATUS FOR SHAPING PLASTIC MATERIALS
Original Filed July 9, 1934　　7 Sheets-Sheet 5

Inventor
Marshall Low

Feb. 15, 1938. M. LOW 2,108,071
METHOD OF AND APPARATUS FOR SHAPING PLASTIC MATERIALS
Original Filed July 9, 1934 7 Sheets-Sheet 6

Inventor
Marshall Low

Patented Feb. 15, 1938

2,108,071

UNITED STATES PATENT OFFICE 2,108,071

METHOD OF AND APPARATUS FOR SHAPING PLASTIC MATERIALS

Marshall Low, Washington, D. C.

Application July 9, 1934, Serial No. 734,349
Renewed May 13, 1937

31 Claims. (Cl. 22—57.5)

This invention relates to a method of and apparatus for shaping plastic materials and it has particular relation to a method of and apparatus for continuously solidifying and shaping materials, specifically metals, which become fluid when subjected to heat, such as is disclosed in applicant's co-pending continuing application Serial No. 636,080 filed October 3, 1932 of which this application is a continuation in part.

One of the objects of the present invention is to provide a method of and apparatus for continuously rolling sheets, bars and the like from metal having a relatively high melting point, such as iron and steel, and delivered in a molten condition, the invention being also applicable to metals having a lower melting point such as lead, aluminum and copper.

Another object of the invention is to provide a method of and apparatus for initially conditioning the metal so as to extract excess heat therefrom thus to accelerate the rate at which the same is rendered plastic prior to its contact with the sheet forming rolls.

Another object of the invention is to provide a method of and apparatus for accelerating the rate of solidification of the metal by controllably reducing the temperature of the metal at intervals as it passes to the shaping rolls and in accordance with a temperature gradient determined by the initial temperature and characteristics of the particular metal.

A further object of the invention is to provide a method of and apparatus for automatically controlling the rate of flow of the metal to the shaping rolls in accordance with the temperature of the metal.

Still another object of the present invention is to provide a method of and apparatus for rendering the metal plastic and shaping the same into sheet form in a relatively inert or non-oxidizing atmosphere.

A still further object of the present invention is to provide an apparatus of the character described which may quickly and easily be adjusted to fabricate sheets or bars of different thickness and in which the cooling and shaping rolls may be separated to discharge the metal therefrom and to provide access thereto when the operation of the apparatus is discontinued.

With such objects in view, as well as other advantages which may be incident to the use of the improvements, the invention consists of the several method steps and combinations thereof and also of the several elements of the apparatus and combinations thereof, hereinafter set forth and claimed with the understanding that the several necessary elements constituting the same may be varied in proportions and arrangement without departing from the nature and scope of the invention as defined in the appended claims.

In order to make the invention more clearly understood there are shown in the accompanying drawings, means for carrying the invention into practical effect, without limiting the improvements in their useful application to the particular constructions which, for the purpose of explanation, have been made the subject of illustration.

Referring to the drawings, and particularly to Figs. 1 to 7 thereof, an apparatus embodying the present invention is shown as comprising a base 1, preferably of cast construction, which is suitably anchored upon a concrete foundation 2 and which supports a pair of parallel vertically extending frame members 3 adjacent to, what may be termed, the front and rear edges of the base. The frame members 3 are also preferably of solid cast construction and are tied together adjacent to their upper edges so as to provide a rigid structure, by means of a horizontally extending beam or beams 4.

Mounted in the frame members 3 for rotation about horizontal axes is a pair of laterally spaced cooling and shaping rolls 5 and 6 and also a pair of vertically spaced upper and lower cooling and flattening rolls 7 and 8, the roll 5 in the present instance functioning as a feeding roll and the roll 6 functioning as an idler roll but cooperating with the roll 5 in defining a sheet forming pass 9.

Figure 1:
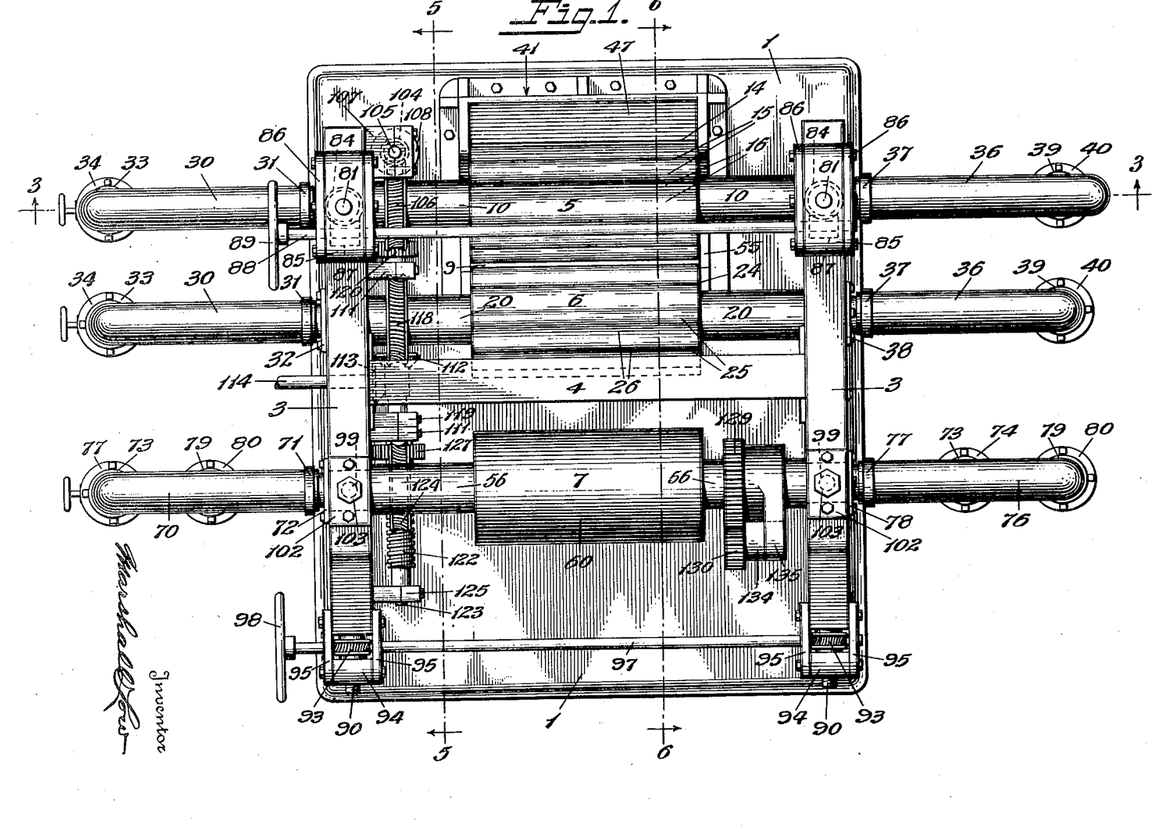
Figure 1 is a plan view of an apparatus constructed in accordance with the present invention.
Figure 2:
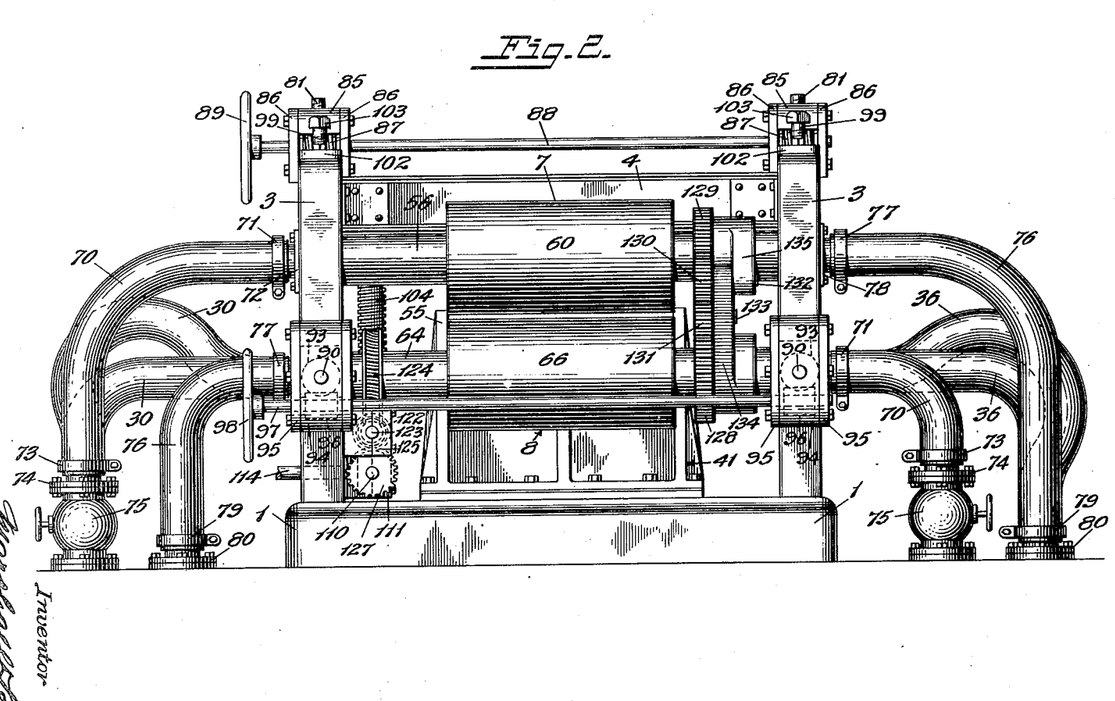
Figure 2 is a side elevational view of the structure illustrated in Fig. 1
Figure 3:
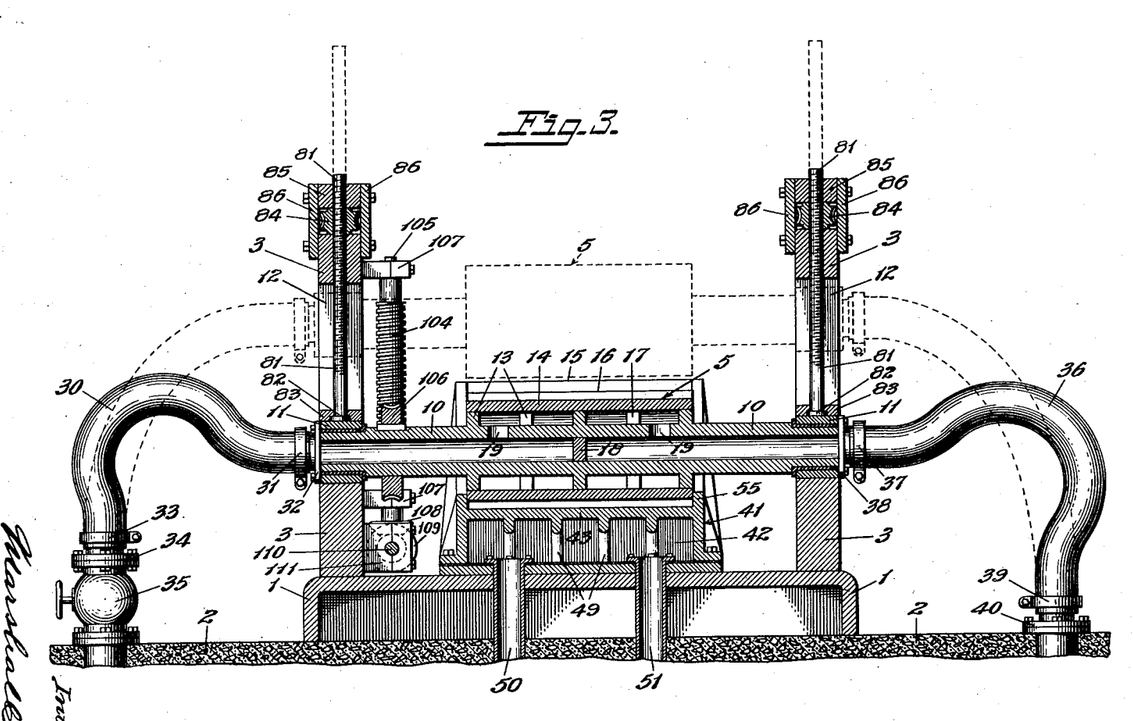
Figure 3 is a vertical longitudinal sectional view taken on line 3—3 of Fig. 1.

The feeding roll 5 comprises a tubular shaft 10 the ends of which are journalled in bearing blocks 11 (Figs. 3 and 4) which are mounted for vertical sliding movement in elongated ways 12 provided in the frame member 3. The intermediate portion of the shaft 10 is formed with spaced collars 13 upon which an outer shell 14 formed with a plurality of circumferentially arranged longitudinally extending elevations 15 and depressions 16 is fixed, preferably by shrinking. The collars 13 are formed with openings 17, the openings in adjacent collars being staggered or circumferentially offset relatively to one another so as to cause a temperature controlling medium to traverse a tortuous path in passing through the roll from end to end (Fig. 3). The shaft 10 is provided with a partition 18 intermediate its ends and also with passages 19 adjacent to the ends of the roll for establishing communication between the tubular shaft 10 and the interior of the feeding roll 5 at each end thereof.

The idler roll 6 of the pair of cooling and shaping rolls 5 and 6 is substantially the same in construction as the feeding roll 5 in that it also comprises a tubular shaft 20, the ends of which are journalled in elongated bearing blocks 21 mounted for horizontal adjustment in ways 22 also provided in the frame members 3. The intermediate portions of the shaft 20 is provided with spaced collars 23 upon which an outer shell 24 also formed with a plurality of circumferentially arranged longitudinally extending elevations 25 and depressions 26, is fixed preferably by shrinking. The collars 23 are provided with staggered openings 27, similar to those described in connection with the feeding roll 5, and the shaft 20 is provided with a partition 28 intermediate its ends and with passages 29 for establishing communication between the tubular shaft 20 and the interior of the roll 6.

A suitable temperature controlling medium which may be live steam, or water or air refrigerated or otherwise according to nature and temperature of the material to be shaped by the rolls 5 and 6, is directed through the feeding roll 5 and through the idler roll 6 from end to end, from flexible inlet pipes 30, the upper ends of which are secured by means of clamping straps 31 to tubular flanged nipples 32 which are bolted to the outer surfaces of the bearing blocks 11 and 21 at the front of the apparatus, and in axial alinement with the tubular shafts 10 and 20. The lower ends of the inlet pipes 30 are secured by means of clamping straps 33 to flanged nipples 34 mounted on inlet valves 35 which control communication between the inlet pipes 30 and a supply main or conduit (not shown).

After passing through the feeding roll 5 and the idler roll 6 the temperature controlling medium escapes from these rolls through flexible outlet pipes 36, the upper ends of which are secured by means of clamping straps 37 to flanged nipples 38 which are bolted to the bearing blocks 11 and 21 at the rear of the apparatus. The lower ends of the outlet pipes 36 are secured by means of clamping straps 39 to flanged nipples 40 which communicate with a discharge main (not shown).

While the temperature controlling medium has been shown and described as passing through the rolls 5 and 6 in the same direction, it will be understood that the medium may be directed through one of these rolls in one direction and through the other of these rolls in an opposite direction, as disclosed in my prior copending application, so as to effect a uniform cooling transversely of the sheet.

Mounted upon the base 1 for cooperation with the elevations 15 of the feeding roll 5, is an abutment or saddle 41 of hollow cast construction providing a chamber 42, and having an arcuate portion 43 having a radius of curvature conforming substantially to the maximum radius of curvature of the feeding roll 5. The arcuate portion 43 of the abutment 41 is adapted to be frictionally engaged by the elevations 15 of the roll 5 when the latter is rotated so as to successively segregate quantities of material, indicated at 44, from a supply of material 45 delivered thereto from a receptacle or container 46. This material may be delivered in a molten condition and rendered plastic during its passage around the arcuate portion 43 of the abutment 41 or it may be delivered in an already plastic condition from a conditioning apparatus hereinafter to be described.

The receptacle 46 may be in the form of a ladle adapted to be removably seated upon an inclined portion 47 of the abutment 41 and upon the upper portion of the feeding roll 5. In any event a close fit is effected so as to minimize the ingress of atmosphere at this point and its oxidizing effect upon the metal. The receptacle may be provided with a gate or plunger 48 so as to interrupt the supply of metal to the feeding roll and to prevent the escape of metal from the receptacle when the latter is being moved to and from the position shown.

The abutment 41 is preferably formed with a plurality of spaced internal ribs 49 which not only reenforce the structure but function as heat dissipating fins. A suitable cooling medium is introduced into the chamber 42 of the abutment 41 through an inlet pipe 50 and escapes therefrom through an outlet pipe 51 (Fig. 3). From an inspection of Fig. 6 of the drawings, it will be noted that the abutment 41 cooperates with the feeding roll 5 and idler roll 6 to define a chamber 52 directly below the sheet forming pass 9 formed by the rolls and into which the successive quantities 44 of metal previously segregated from the parent body 45 of metal in the receptacle 46 and rendered plastic by the cooling action of the roll 5 and abutment 41, are fed and reunited to form a homogeneous mass, indicated at 53, prior to being carried through the pass 9 to be shaped into a corrugated sheet, indicated at 54. The abutment 41 is formed with vertically extending flanges or wing portions 55 adjacent to each end thereof which prevent the escape of the metal from the depresssion 15 of the feeding roll 5 and from the chamber 52 and also from the pass 9 in a direction lengthwise of the roll.

The upper flattening roll 7 comprises a tubular shaft 56 the ends of which are journalled in bearing blocks 57 which are slidably mounted for vertical adjustment in ways 58 formed in the frame members 3. The intermediate portion of the shaft 56 is provided with spaced collars 59 upon which an outer cylindrical shell 60 is fixed. The collars 59 are provided with staggered openings 61 and the shaft 56 is provided with a partition 62 and with passages 63 for establishing communication between the tubular shaft and the space between the shaft and the shell 60, as hereinbefore described in connection with the rolls 5 and 6.

In a like manner the lower flattening roll 8 comprises a tubular shaft 64 the ends of which are journalled in the elongated bearing blocks 21 in which the ends of the shaft 20 of the idler roll 6 are also journalled for horizontal adjustment simultaneously with the roll 6 as will presently be described. The intermediate portion of the shaft 64 is provided with spaced collars 65 upon which a cylindrical shell 66 is also fixed. The collars 65 are provided with staggered openings 67 and the shaft 64 is provided with a partition 68 and with passages 69 for establishing communication between the shaft and the space between the shaft and the shell 66. One or the other of the rolls 7 and 8 may be provided with the usual end collars (not shown) so as to determine the width of the sheet passing therebetween.

A temperature controlling medium is directed through the upper and lower cooling and flattening rolls 7 and 8 in opposite directions with respect to one another, from flexible inlet pipes 70 the upper ends of which are secured by means of clamping straps 71 to tubular flanged nipples 72 bolted to the outer surfaces of the bearing blocks 57 and 21. The lower ends of the inlet pipes 70 are secured by clamping straps 73 to flanged nipples 74 mounted on inlet valves 75 which control communication between the inlet pipes 70 and supply mains (not shown) located at the front and rear of the apparatus.

After passing through the rolls 7 and 8 the temperature controlling medium escapes from these rolls through flexible outlet pipes 76, the upper ends of which are secured by means of clamping straps 77 to flanged nipples 78 which are bolted to the bearing blocks 57 and 21, also in axial alinement with the shafts 56 and 64. The lower ends of the outlet pipes 76 are secured by clamping straps 79 to flanged nipples 80 which communicate with discharge mains (not shown) also located at the front and rear of the apparatus.

It will be apparent from the foregoing description that the construction and arrangement of the several inlets and outlets is such that the temperature controlling medium flows through the flattening rolls in opposite directions, so as to insure that the sheet is cooled uniformally transversely thereof.

Figure 6:
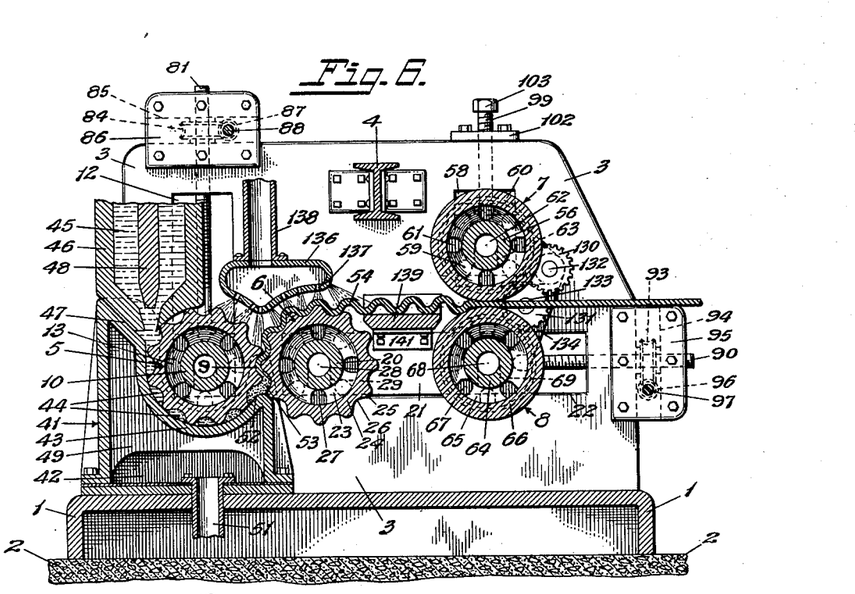
Figure 6 is a vertical transverse sectional view taken on line 6—6 of Fig. 1, and illustrating the cooling and shaping rolls in their operative or sheet forming positions.
Figure 7:
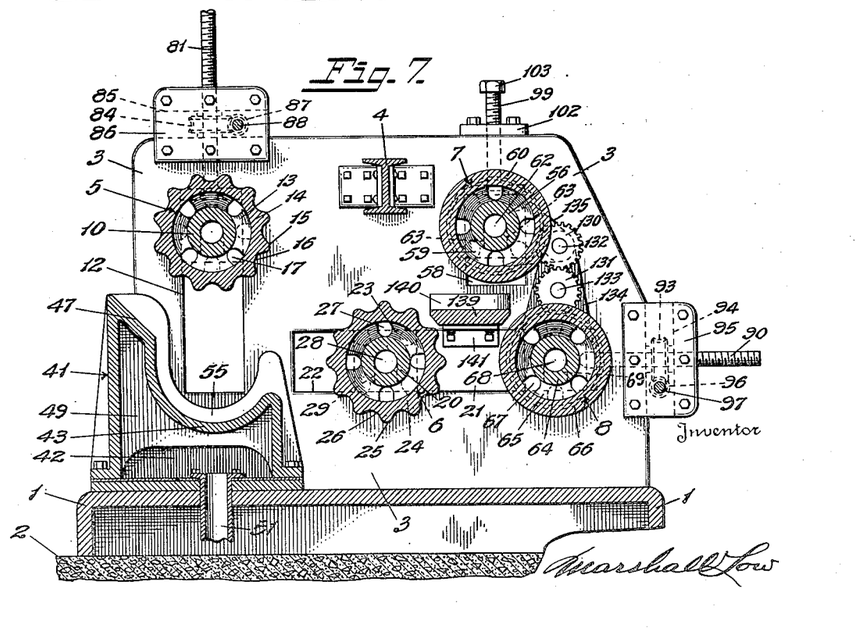
Figure 7 is a view similar to Fig. 6 but illustrating the rolls in their inoperative or separated positions.

The feeding roll 5 may be raised and lowered with respect to the abutment 41 so as to interrupt the operation of the apparatus, as shown in Fig. 7, by means of adjusting screws 81 having heads 82 at their lower ends which are rotatably confined within keepers 83 bolted to the upper surfaces of the adjustable slide bearing blocks 11 (Fig. 3). The upper portions of the screws 81 are threaded into worm nuts 84 which are confined between the upper surfaces of the frame members 3 and bars 85 secured to the frame members by side plates 86. The worm nuts 84 are rotated in order to raise and lower the adjusting screws 81 and parts carried thereby, by means of worms 87 fixed to a shaft 88 extending between the frame members 3 and which are journalled in the side plates 86. This shaft is provided with a hand wheel 89 at its forward end by means of which the feeding roll 5 may be moved between its operative and inoperative positions as shown in Figs. 6 and 7.

Figure 4:
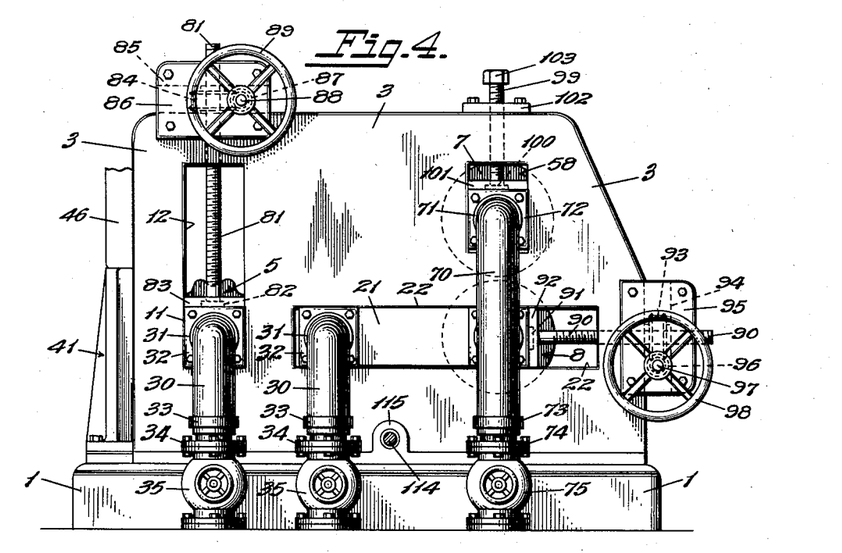
Figure 4 is an elevational view as viewed from the left in Fig. 1.
Figure 5:
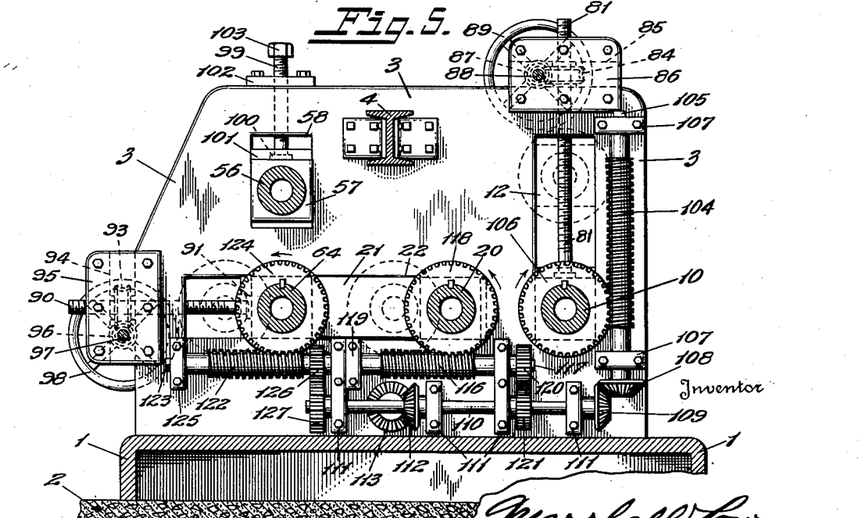
Figure 5 is a vertical transverse sectional view taken on line 5—5 of Fig. 1.

Similarly, the idler roll 6 may be moved between its operative and inoperative positions by means of jack screws 90 having heads 91 at their inner ends which are rotatably confined within keepers 92 bolted to the outer ends of the elongated bearing blocks 21 (Fig. 4). The outer portions of the jack screws 90 are threaded into worm nuts 93 which are confined between the outer surfaces of the frame members 3 and bars 94 secured to the frame members by side plates 95. The worm nuts 93 are rotated in order to shift the jack screws 90 and the parts connected thereto, by means of worms 96 fixed to a shaft 97 extending between the frame members 3 and which is journalled in the side plates 95. This shaft is provided with a hand wheel 98 at its forward end by means of which the idler roll 6 and also the lower flattening roll 8 may be moved between their operative and inoperative positions shown in Figs. 6 and 7.

The upper flattening roll 7 may be adjusted vertically with respect to the cooperating lower flattening roll 8 by means of adjusting screws 99 having heads 100 at their lower ends which are rotatably confined within keepers 101 bolted to the upper surfaces of the bearing blocks 57. The upper portions of the screws 99 are threaded into blocks 102 bolted to the upper surfaces of the frame members 3 and are provided with heads 103 by means of which they may be turned by a wrench so as to adjust the size of the pass between the rolls 7 and 8.

Figure 10:
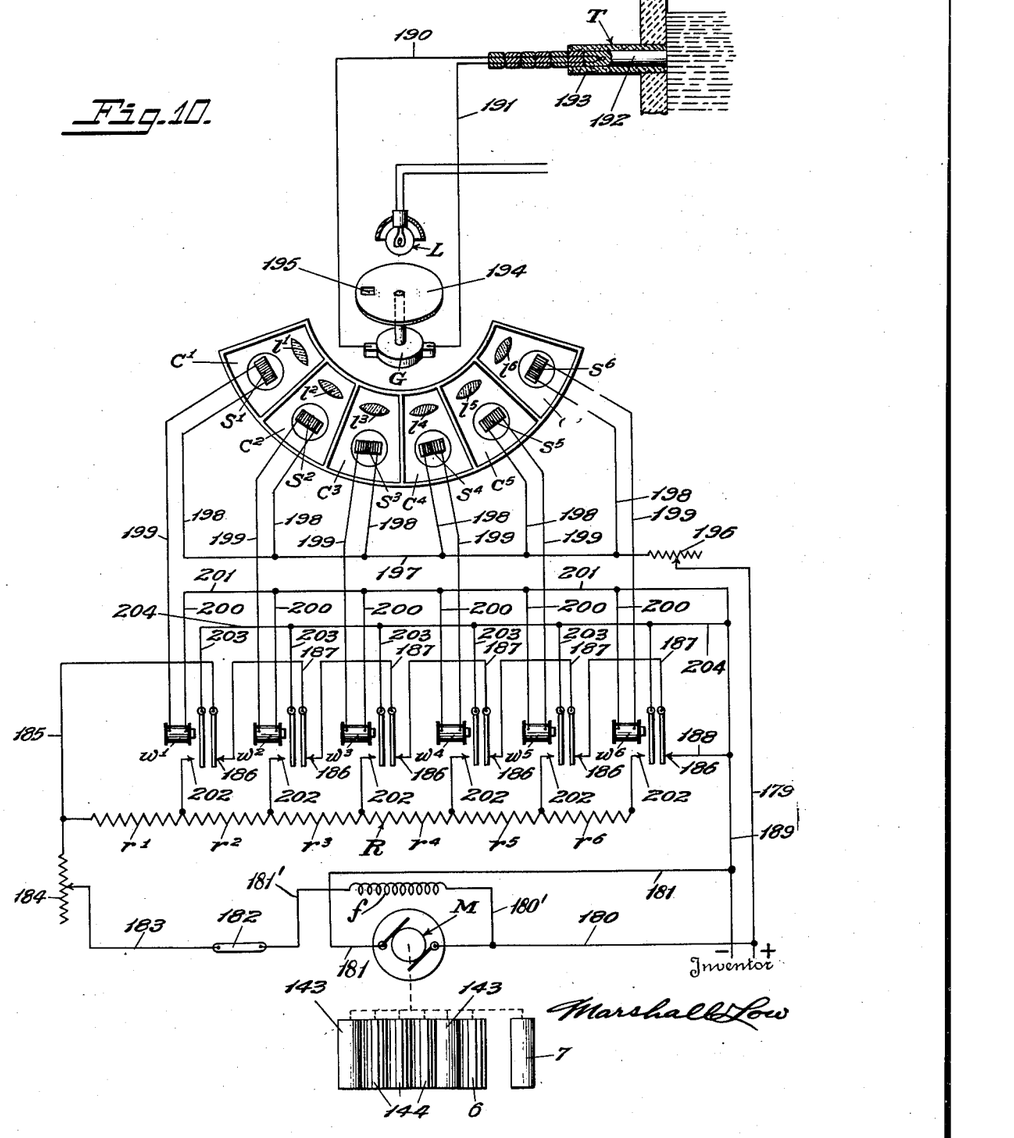
Figure 10 is a diagrammatic view of the thermo-responsive means for automatically varying the speed of rotation of the rolls of either the sheet shaping apparatus or the conditioning means or both, in accordance with the temperature of the metal.

The feeding roll 5 is rotated in its lower position so as to feed and shape the material and also in its upper position so as to free material therefrom, by means of an elongated worm 104 (Fig. 5) which is fixed to a vertically extending shaft 105 for intermeshing engagement with a worm gear 106 fixed to the shaft 10. The shaft 105 is journalled in bearings 107 carried by the frame member 3 at the front of the apparatus and is provided with a beveled pinion 108 at its lower end for intermeshing engagement with a beveled pinion 109 fixed to one end of a horizontally extending jack shaft 110. The jack shaft 110 is journalled in bearing blocks 111 carried by the frame member 3 and has also fixed thereto a beveled pinion 112 which meshes with a beveled pinion 113 fixed to a transversely extending drive shaft 114. The shaft 114 is journalled in a bearing 115 provided in the forward frame member 3 and is driven directly or indirectly by an electric motor M (Fig. 10).

The idler roll 6 is rotated in a direction opposite to the direction of rotation of the feeding roll 5 but in unison therewith with the elevations and depressions thereof in constantly registering spaced relation with the elevations and depressions of the feeding roll 5, by means of an elongated worm 116 fixed to a shaft 117 for intermeshing engagement with a worm gear 118 fixed to the tubular shaft 20 of the idler roll 6. The shaft 117 extends parallel to the jack shaft 110 and is journalled in one of the bearing blocks 111 and a bearing block 119. A spur gear 120 is fixed to one end of the shaft 117 and is driven by a spur gear 121 of the same ratio fixed to the jack shaft 110 intermediate its ends.

The lower flattening roll 8 is driven in the same direction as the idler roll 6 but at a greater rate of speed, by means of an elongated worm 122 fixed to a shaft 123 for intermeshing engagement with a worm gear 124 fixed to the tubular shaft 64. The shaft 123 is journalled in one of the bearing blocks 111 and a bearing block 125 in axial alinement with the shaft 117 and is provided with a pinion 126 at one end which is driven by a spur gear 127 fixed to the adjacent end of the jack shaft 110. The ratio between the pinion 126 and gear 127 is such as to rotate the flattening roll 8 at a speed in excess to that of the rolls 5 and 6. This prevents material from accumulating between these rolls caused by the attenuation of the sheet when the corrugations therein are removed.

The worms 104, 116 and 122 are of elongated construction so as to permit the rolls 5, 6 and 8 to be adjusted or moved into and out of operative position without interrupting driving engagement with the associate worm gears 106, 118 and 124, thus not only enabling the rolls 5, 6 and 8 to be rotated in all positions within their ranges of adjustment but insuring against the clashing of the gears which would otherwise result.

The upper flattening roll 7 is rotated in the direction indicated in Fig. 7, by means of a spur gear 128 (Fig. 2) which is fixed to the lower tubular shaft 64 at the rear of the apparatus and which drives a spur gear 129 of the same ratio fixed to the tubular shaft 56 of the roll 7 through the medium of intermeshing upper and lower idler pinions 130 and 131 respectively (Figs. 6 and 7). These pinions are journalled on stud shafts 132 and 133 carried by an arm 134 which is mounted on the lower tubular shaft 64 for swinging movement thereon. The stud shaft 132 upon which the upper pinion 130 is journalled, is pivotally connected to an arm 135 mounted on the upper tubular shaft 56 for swinging movement thereon. This construction insures that the pinions 130 and 131 will traverse paths concentric or planetary with respect to both the gears 128 and 129 and thus maintain driving connections between the rolls 7 and 8 when either the former is adjusted vertically or the latter is adjusted horizontally, as previously described.

It will be apparent from the foregoing that when the rolls 5 and 6 are rotated the former cooperates with the abutment 41 in the manner of a gear pump in that the elevations and depressions 15 and 16 segregate the successive quantities 44 of material from the supply 45 and subjects them individually to the cooling effect of the rolls and abutment at points remote from the parent body of material in the container 46. The continued rotation of the roll 5 carries these segregated quantities of material into the chamber 52 where they are reunited and where any skins formed thereon by contact with the roll 5 and abutment 41 are remelted by the internal heat of the material so as to form the homogeneous plastic mass 53. The continued rotation of the rolls 5 and 6 carries the material, which has by this time reached such a degree of plasticity as to retain its form, upwardly through the pass 9 and is fabricated by the rolls 5 and 6 into the sheet 54 of substantially corrugated configuration.

After emerging from the pass 9, the sheet passes over the idler roll being further subjected to the cooling effect thereof for one fourth of its circumference during which time it is further reduced in temperature by a fluid cooling medium in the form of jets projected thereagainst from a removable box 136 (Fig. 6) which is provided with numerous apertures 137 and which is supplied with a cooling fluid under pressure from an inlet pipe 138. During the passage of the sheet from the idler roll 6 to the cooling and flattening rolls 7 and 8 the sheet is supported by a table 139 provided with guide flanges 140 and supported by brackets 141 fixed to the elongated bearing blocks 21 so as to be movable bodily with the rolls 6 and 8 when the latter are adjusted, as hereinbefore described.

When the apparatus is employed to roll iron or steel or other metals having relatively high melting points, it may be desirable to condition the metal to some extent by reducing the temperature thereof to a predetermined degree prior to introducing the same to the cooling and shaping rolls 5 and 6. This may be accomplished by an apparatus, such as that illustrated in Fig. 8, which comprises a plurality of cylindrical lower rolls 142 arranged in side-by-side relation, a plurality of upper outer cylindrical rolls 143 and a plurality of upper intermediate corrugated rolls 144 also arranged in side-by-side relation and cooperating with the lower rolls 142 in defining a series of intercommunicating chambers 145.

The lower cylindrical rolls 142 are of the same construction as the flattening rolls 7 and 8, hereinbefore described, so as to permit a cooling medium to be circulated therethrough and are journalled in bearing blocks 146 which are mounted for horizontal sliding movement in elongated ways 147 provided in the frame members 3, which in this case are of the elongated construction shown. The lower rolls 142 are additionally supported by back-up rolls 148 which are journalled in bearing blocks 149 carried by the base 1 and are arranged in contiguous relation with one another and with the right hand roll 143 in close proximity to the abutment 41 so as to prevent the escape of material from the chambers 145.

The upper outer cylindrical rolls 143 are of the same construction as the lower rolls 142 but the intermediate rolls 144 are constructed similar to the cooling and shaping rolls 5 and 6 in that these rolls are also provided with a plurality of circumferentially arranged longitudinally extending elevations and depressions 150 and 151 respectively. The rolls 143 and 144 are journalled in bearing blocks 152 which are mounted for vertical adjustment in ways 153 also provided in the frame members 3. The upper left hand roll 143 is arranged in contiguous relation with the lower left hand roll 142 and the upper right hand roll 143 is disposed above and in close proximity to the feeding roll 5 so as to prevent the escape of material and to minimize the ingress of atmospheric air at these points.

Molten metal is introduced downwardly into the left hand chamber 145 from a feeding device 154 removably seated upon or in close proximity to the upper left hand roll 143 and the adjacent corrugated roll 144. This device is adapted to contain a supply of molten metal 155 and is provided with a discharge outlet 156, the passage of material through which is controlled by a gate or plunger 157.

The metal is fed from chamber to chamber by the movement of the several rolls 142, 143 and 144 which are rotated in the directions indicated, in any suitable manner, the elevations 150 on the rolls 144 functioning as impellers so as to positively move the metal toward the cooling and shaping rolls 5 and 6.

The metal is prevented from escaping from the chambers 145 in a direction lengthwise of the rolls, by means of movable end members 158, such as those disclosed in application Serial No. 636,080 hereinbefore referred to.

Atmospheric air is excluded from the chambers 145 by means of a hood or casing 159 disposed above the upper rolls 143 and 144 and in contiguous relation therewith. An inert or non-oxidizing gas is introduced into the hood 159 through an inlet pipe 160 and escapes therefrom through an outlet pipe 161. This gas fills the space in the chambers not occupied by the metal and provides a series of atmospheres through which the metal passes, which atmospheres not only prevent the oxidation of the metal but assist in the cooling thereof.

A suitable cooling medium is circulated through the several rolls 142, 143 and 144 in a manner similar to that hereinbefore described in connection with the rolls 5, 6, 7 and 8.

The upper rolls 143 and 144 may be elevated out of contact with the metal supported by the lower rolls 142 by means of adjusting screws 162 having heads 163 at their lower ends which are rotatably confined within keepers 164 bolted to the upper surfaces of the bearing blocks 152. The upper portions of the screws 162 are threaded into worm nuts 165 which are confined between the upper surfaces of the frame members 3 and the bars 85 secured to the frame members by the side plates 86. The worm nuts 165 are rotated in order to raise and lower the adjusting screws 162 and parts carried thereby, by means of worms 166 fixed to shafts 167 extending between the frame members 3 and which are journalled in the side plates 86. These shafts are provided with hand wheels 168 at their forward ends by means of which the rolls 143 and 144 may be independently moved between their operative and inoperative positions.

Similarly, the lower rolls 142 may be moved horizontally so as to separate the same so to discharge metal from the chambers 145, by means of jack screws 169 having heads 170 at their inner ends which are rotatably confined within keepers 171 secured to the outer ends of the left hand bearing blocks 146. The outer portions of the jack screws 169 are threaded into worm nuts 172 which are confined between the outer surfaces of the elongated frame members 3 and bars 173 secured to the frame members by side plates 174. The worm nuts 172 are rotated in order to shift the jack screws 169 and parts connected thereto, by means of worms 175 fixed to a shaft 176 extending between the frame members 3, and which are journalled in the side plates 174. This shaft is also provided with a hand wheel 177 at its forward end by means of which the lower rolls 142 may be moved bodily between their operative and inoperative positions. When the left hand roll is moved to the left, as viewed in Fig. 8, a space is provided between this roll and the next adjacent roll 142 through which metal may escape downwardly from the left hand chamber 145. The other rolls 142 may then be moved manually successively to the left to evacuate the remaining chambers 145. If desired the several bearing blocks 146 may be coupled by a suitable lost motion connection so that when the jack screws 169 are operated the rolls 142 will be moved successively to the left until all of the rolls are separated from one another and from the abutment 41.

Figure 8:
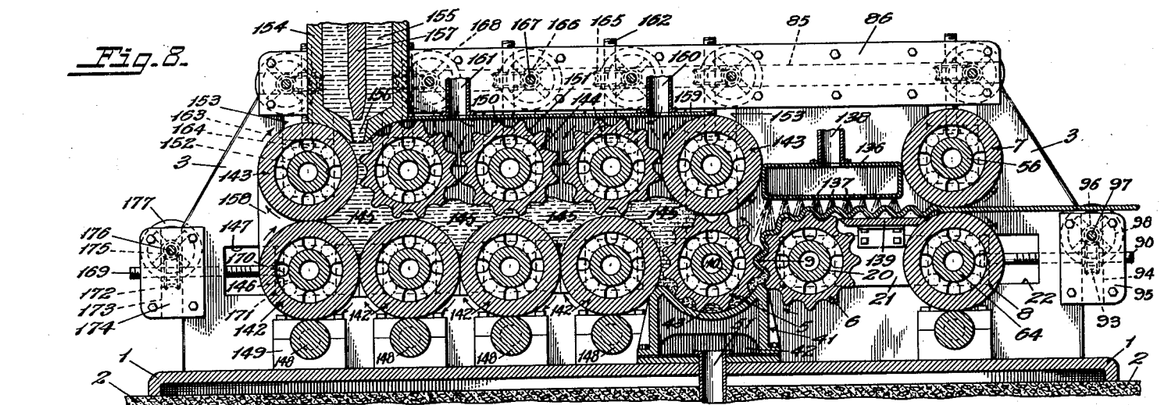
Figure 8 is a vertical transverse sectional view through the conditioning means for extracting excess heat from the metal prior to its contact with the cooling and shaping rolls, said conditioning means being illustrated in connection with an apparatus such as that shown in Figs. 1 to 7.
Figure 9:
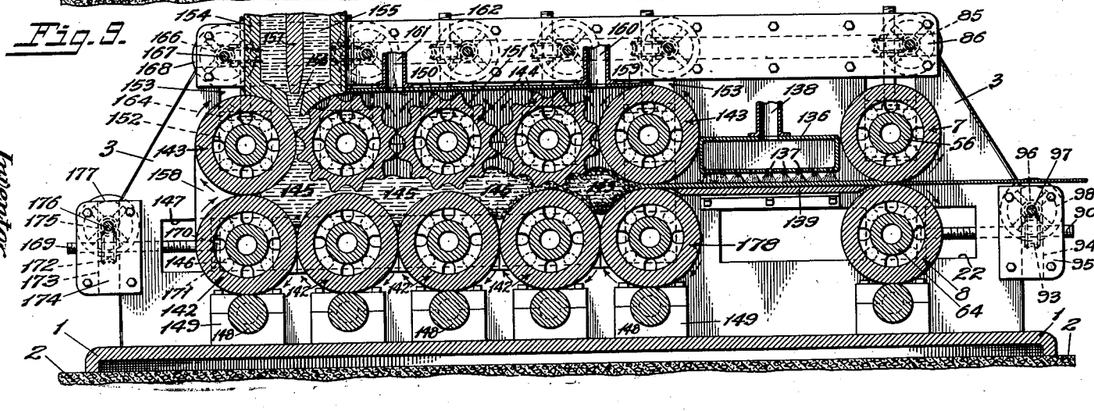
Figure 9 is a view similar to Fig. 8 but illustrating the conditioning means slightly modified in construction so as to impart a preliminary configuration to the sheet.

In Figure 9 there is illustrated another embodiment of the invention in which the corrugated feeding rolls 5 and 6 and abutment 41 shown in Figure 8 are replaced by a single cylindrical roll 178. In this particular construction the right hand rolls 143 and 178 function as shaping rolls so as to impart a preliminary configuration to the sheet which may be of a semi-cast internal structure. In this case the sheet may be considered as an ingot in sheet form to be subsequently rolled by the rolls 7 and 8 so as to obtain a sheet having a more dense molecular structure and more finished surfaces.

The adaptability of the structure illustrated in Figure 9 depends entirely upon the rate of cooling of the metal as it passes from chamber to chamber. This may be regulated according to a predetermined temperature gradient by controlling the volume and rate of flow of the cooling medium through the several rolls, by means of suitable valve mechanisms. Obviously, when a structure such as that illustrated in Figure 9 is employed, the metal must assume the necessary degree of plasticity before passing between the sheet shaping rolls 143 and 178. The subject matter of this last described construction is more particularly covered in another application.

Obviously if the cooling and shaping rolls 5 and 6 or the rolls 143 and 178 are rotated too rapidly with respect to the rate at which the metal dissipates its heat, the metal will not become sufficiently solidified to retain its sheet form after passing between the outermost pairs of rolls. On the other hand, if the rolls are rotated too slowly the metal may reach such a degree of solidity as to subject the rolls to excessive strain if not actually "freezing" while in contact therewith. Also, the temperature of the metal as well as that of the cooling medium flowing through the rolls may fluctuate to such an extent and so frequently as to render any constant roll speed impractical.

According to the present invention these difficulties and uncertainties are avoided by the provision of thermo-responsive means for automatically varying the speed of the motor M and that of the rolls of the conditioning means or shaping apparatus or both in accordance with the temperature of the metal and any fluctuations therein.

With particular reference to Fig. 10 of the drawings, the armature winding of the motor M is shown as being energized by direct current which traverses a circuit from a suitable source, such as positive bus wire 179, through wire 180, armature winding of motor M, and wire 181, to negative bus wire 189. The field winding of motor M is also energized by current which traverses a circuit from positive bus wire 179, wires 180 and 180' field winding $f$ of motor M, wire 181', manually operable switch 182, wire 183, manually adjustable rheostat 184, wire 185, back contacts 186 and connecting wires 187 of a series of relays, indicated by the letter $w$ with exponents according to their order of energizing, and wire 188 to negative bus wire 189. Under these conditions the motor M will drive the cooling and shaping rolls 5 and 6 as well as the several rolls of the conditioning apparatus at a maximum speed determined by the manual adjustment of the rheostat 184 and the rolls will fabricate sheets, as previously described, if the metal dissipates its heat the proper rate at such roll speed.

The speed of the motor M and the several rolls driven thereby is automatically controlled by one or more thermo-responsive means such as a thermocouple T which may be positioned adjacent to the molten metal within the receptacle 46, feeding device 154 or within certain or all of the chambers 52 and 145 or at all of these localities so that the temperature of the metal will generate an electric current, in the well known manner, in a circuit including wires 190 and 191, connecting the terminals of the thermocouple T with those of a galvanometer G. The hot end of the thermocouple T is suitably connected with the outer end of a metal bar 192 the inner end of which is exposed to the hot metal and which is provided with a suitable heat insulating covering 193 so as to insure a uniform drop in temperature from end to end. The temperaure of the inner end of the bar 192 is that of the metal with which it is in contact but the drop in temperature longitudinally of the bar is such as to prevent the thermocouple from being damaged by being subjected to excessive heat. However, sufficient heat is transmitted to the thermocouple T by conduction to insure that the same will operate properly in accordance with fluctuations in the temperature of the metal at the particular locality where it is located.

The galvanometer G operates a disk or shutter 194 provided with an aperture 195 through which light rays emanating from a source of light, such as an electric lamp L, may progressively be admitted into a series of chambers c. Located within each of the chambers c is a selenium cell or resistor s and also a lens l for focusing the light rays admitted through the aperture 195 upon the light sensitive element of the cells s.

When the temperature of the metal in the vicinity of the thermocouple T reaches a predetermined degree, the galvanometer G will swing the shutter 194 to a position in which its aperture 195 registers with the first chamber $c^1$ of the series so that light from the lamp L will be focused upon the selenium cell $s^1$ thus rendering the light sensitive element thereof sufficiently conductive to effect the energizing of relay $w^1$ by current traversing a circuit from positive bus wire 179, through a manually adjustable resistance element 196, wires 197, and 198, light sensitive element of the selenium cell $s^1$, wire 199, winding of relay $w^1$, and wires 200 and 201 to the negative bus wire 189. The energizing of the relay $w^1$ by current flowing in the circuit just traced causes it to open its back contact 186 and to close a front contact 202 thereof. This opens the circuit previously traced for the motor M but establishes an auxiliary circuit therefor through the first section $r^1$ of a resistance R, front contact 202 of relay $w^1$ and wires 203 and 204 to the negative bus wire 189. The introduction of this additional resistance $r^1$ into the motor circuit causes the speed of the motor and that of the rolls which it drives to decrease a predetermined amount so as to allow a greater period of time for the metal to dissipate its heat and reach the desired degree of plasticity before passing between the rolls performing the shaping function.

If the speed of the rolls is still too high to permit the metal to become sufficiently plastic to retain its sheet form after passing between the shaping rolls, the galvanometer G will swing the shutter 194 until the aperture 195 therein registers with the next adjacent chamber $c^2$ of the series so that light from the lamp L will render the next succeeding selenium cell $s^2$ electrically conductive and cause the energizing of the relay $w^2$. The energizing of the relay $w^2$ introduces the next section $r^2$ of the resistance R into the motor circuit so as to cause the motor M to rotate at a still further reduced speed. It will be understood that when the front contact 202 of one of the succeeding relays $w$ is closed, as above described, the front contact 202 of the preceding relay $w$ is opened so that the current in the motor circuit will be compelled to traverse all of the sections $r$ of the resistance R which are introduced into this circuit by the closing of the front contact 202 of the relay last energized. The above described operations are repeated successively until the desired amount of resistance is included in the circuit of the motor M.

It will be understood that the chambers c are impervious to light except when the aperture 195 in the shutter 194 is moved into registry therewith. Also, it will be understood that suitable amplifying means may be provided in the circuits of the several selenium cells if so desired.

For the purpose of illustration, the current is schematically shown as passing directly through the contacts 186 and 202 of the relays $w$, but it will be appreciated by those skilled in the art that the contacts of these relays may be employed to energize auxiliary circuits including circuit makers and breakers of a type particularly adapted to carry the current employed, especially where normally high current values are to be dealt with.

The hereinabove described control system is given by way of example only, it not being intended to limit the instant improvements to any particular circuit or circuits.

From the foregoing it will be apparent that an apparatus is provided in which the metal is not only rolled to sheet form but in which the metal is also conditioned prior to the rolling operation. By regulating properly the rate of movement of the cooling medium through the several rolls, or by regulating the speed of the rolls, or both, the rate of dissipation of heat from the metal may be adjusted in accordance with a temperature gradient determined by the initial temperature of the metal or the characteristics of the particular metal being rolled. This gradient may be uniform in character or it may be shaped according to requirements.

The sheets of metal issue from the apparatus in a relatively hot condition and may immediately be fed to other instrumentalities for further shaping or conditioning operations. For example, the sheets may be fed directly to drop hammers to be forged thereby into articles of appropriate shape while the metal is still hot from its original heat. Also the metal may be fed to other rolls for further reduction in thickness, or they may immediately be introduced into annealing ovens or subjected to tempering, carburizing, or other heat treating processes or operations.

Other modifications and changes in proportion and arrangement of the several necessary elements constituting the invention may be made by those skilled in the art without departing from the nature and scope of the invention as defined in the appended claims.

What is claimed is:

1. The method of fabricating sheets or bars from metal delivered in a molten condition which comprises the steps of passing the molten metal through a series of non-oxidizing atmospheres; reducing the temperature of the metal during its passage through said atmospheres in accordance with a predetermined temperature gradient to extract excess heat from the metal and to accelerate its rate of solidification; successively segregating quantities of metal from the metal thus reduced in temperature; reuniting the segregated quantities of metal to form a homogeneous mass; and finally shaping the metal into sheet or bar form when the same attains a sufficiently plastic condition and while it is still hot from its original heat.

2. The method of fabricating sheets or bars from metal delivered in a molten condition which comprises the steps of passing the molten metal through a series of non-oxidizing atmospheres; reducing the temperature of the metal during its passage through said atmospheres in accordance with a predetermined temperature gradient to extract excess heat from the metal and to accelerate its rate of solidification; successively segregating quantities of metal from the metal thus reduced in temperature; reuniting the segregated quantities of metal to form a homogeneous mass; and finally shaping the metal into sheet or bar form when the same attains a sufficiently plastic condition and while it is still hot from its original heat, and automatically controlling the rate of movement of the metal in accordance with the rate of the reduction of the temperature of the metal.

3. The method of fabricating sheets or bars from metal delivered in a molten condition which comprises the steps of propelling the molten metal by a succession of impulses along a predetermined path to liberate trapped gas from the metal; reducing the temperature of the metal during its passage along said path in accordance with a predetermined temperature gradient to extract excess heat from the metal and to accelerate its rate of solidification; successively segregating quantities of metal from the metal thus reduced in temperature; reuniting the segregated quantities of metal to form a homogeneous mass; and finally shaping the metal into sheet or bar form when the same attains a sufficiently plastic condition and while it is still hot from its original heat, certain of said steps being performed in an inert or non-oxidizing atmosphere.

4. The method of fabricating sheets or bars from metal delivered in a molten condition which comprises the steps of propelling the molten metal by a succession of impulses along a predetermined path to liberate trapped gas from the metal; reducing the temperature of the metal during its passage along said path in accordance with a predetermined temperature gradient to extract excess heat from the metal and to accelerate its rate of solidification; successively segregating quantities of material from the metal thus reduced in temperature; reuniting the segregated quantities of metal to form a homogeneous mass; and finally shaping the metal into sheet or bar form when the same attains a sufficiently plastic condition and while it is still hot from its original heat, certain of said steps being performed in an inert or non-oxidizing atmosphere; and automatically controlling the rate of movement of the metal in accordance with the rate of the reduction of the temperature of the metal.

5. The method of fabricating sheets or bars from metal delivered in a molten condition which comprises the steps of propelling the molten metal by a succession of impulses through a series of non-oxidizing atmospheres; reducing the temperature of the metal controllable amounts at intervals during its movement through said atmospheres to extract excess heat from the metal and to accelerate its rate of solidification; successively segregating quantities of metal from the metal thus reduced in temperature; reuniting the segregated quantities of metal to form a homogeneous mass; and finally shaping the metal into sheet or bar form when the same attains a sufficiently plastic condition and while it is still hot from its original heat.

6. The method of fabricating sheets or bars from metal delivered in a molten condition which comprises the steps of propelling the molten metal by a succession of impulses through a series of non-oxidizing atmospheres; reducing the temperature of the metal controllable amounts at intervals during its movement through said atmospheres to extract excess heat from the metal and to accelerate its rate of solidification; successively segregating quantities of metal from the metal thus reduced in temperature; reuniting the segregated quantities of metal to form a homogeneous mass; and finally shaping the metal into sheet or bar form when the same attains a sufficiently plastic condition and while it is still hot from its original heat; and automatically controlling the rate of movement of the metal in accordance with the rate of the reduction of the temperature of the metal.

7. Apparatus of the character described comprising a pair of shaping rolls, each having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; an abutment cooperating with the elevations of at least one of said rolls, whereby when such roll is rotated the same will segregate successive quantities of metal from metal delivered thereto and to convey the same through said pass to be shaped by said rolls into a sheet of substantially corrugated configuration; conditioning means for receiving a supply of molten metal and delivering the same to said shaping rolls, said conditioning means including a plurality of chambers communicating with one another through restricted passages normally closed by the metal passing therethrough; and means for reducing the temperature of the metal received by said conditioning means according to a predetermined temperature gradient to extract excess heat from the metal prior to its delivery to said shaping rolls.

8. Apparatus of the character described comprising a pair of shaping rolls, each having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; an abutment cooperating with the elevations of at least one of said rolls, whereby when such roll is rotated the same will segregate successive quantities of metal from metal delivered thereto and to convey the same through said pass to be shaped by said rolls into a sheet of substantially corrugated configuration; conditioning means for receiving a supply of molten metal and delivering the same to said rolls, said conditioning means including a plurality of chambers communicating with one another through restricted passages normally closed by the metal passing therethrough; means for reducing the temperature of the metal received by said conditioning means controllable amounts at intervals along said conditioning means to eliminate excess heat from the metal prior to its delivery to said shaping rolls; and means responsive to the temperature of the metal for controlling the speed of rotation of said shaping rolls.

9. Apparatus of the character described comprising a pair of shaping rolls, each having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; an abutment cooperating with the elevations of at least one of said rolls, whereby when such roll is rotated the same will segregate successive quantities of metal from metal delivered thereto and to convey the same through said pass to be shaped by said rolls into a sheet of substantially corrugated configuration; conditioning means for receiving a supply of molten metal and delivering the same to said shaping rolls; said conditioning means including a plurality of lower rolls arranged in side-by-side contiguous relation, and a plurality of upper rolls arranged in side-by-side relation and spaced from said lower rolls and defining therewith a plurality of chambers communicating with one another through relatively narrow passages and through which the metal passes to said shaping rolls, and means for circulating a cooling medium through said upper and lower rolls to extract excess heat from the metal prior to its delivery to said shaping rolls.

10. Apparatus of the character described comprising a pair of shaping rolls, each having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; an abutment cooperating with the elevations of at least one of said rolls, whereby when such roll is rotated the same will segregate successive quantities of metal from metal delivered thereto and to convey the same through said pass to be shaped by said rolls into a sheet of substantially corrugated configuration; conditioning means for receiving a supply of molten metal and delivering the same to said shaping rolls; said conditioning means including a plurality of lower rolls arranged in side-by-side contiguous relation, and a plurality of upper rolls arranged in side-by-side relation and spaced from said lower rolls and defining therewith a plurality of chambers communicating with one another through relatively narrow passages and through which the metal passes to said shaping rolls, certain of said upper rolls having impeller portions for propelling the metal toward said shaping rolls; and means for circulating a cooling medium through said upper and lower rolls to extract excess heat from the metal prior to its delivery to said shaping rolls.

11. Apparatus of the character described comprising a feeding roll and an idler roll, each of said rolls having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; an abutment cooperating with the elevations of said feeding roll, whereby when such roll is rotated the same will segregate successive quantities of molten metal from metal delivered thereto and to convey the same through said pass to be shaped by said rolls into a sheet of substantially corrugated configuration; means for moving said feeding roll vertically out of operative relation with said abutment; and means for moving said idler roll horizontally out of operative relation with said feeding roll.

12. Apparatus of the character described comprising a feeding roll and an idler roll, each of said rolls having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; an abutment cooperating with the elevations of said feeding roll, whereby when such roll is rotated the same will segregate successive quantities of metal from metal delivered thereto and to convey the same through said pass to be shaped by said rolls into a sheet of substantially corrugated configuration; means for rotating said feeding roll and said idler roll in unison; and means for moving said feeding roll vertically out of operative relation with said abutment, and said idler roll horizontally out of operative relation with said feeding roll while maintaining driving relation with said rotating means.

13. Apparatus of the character described comprising a pair of shaping rolls, each having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; an abutment cooperating with the elevations of at least one of said rolls, whereby when such roll is rotated the same will segregate successive quantities of metal from metal delivered thereto and to convey the same through said pass to be shaped by said rolls into a sheet of substantially corrugated configuration; conditioning means for receiving a supply of molten metal, extracting excess heat therefrom to render the same relatively plastic, and delivering the same to said shaping rolls, said conditioning means including a plurality of lower rolls arranged in side-by-side relation, and a plurality of upper rolls arranged in side-by-side relation and spaced from said lower rolls and defining therewith a plurality of chambers communicating with one another through relatively narrow passages and through which the metal passes to said shaping rolls; and means responsive to the temperature of said metal for automatically controlling the speed of rotation of said shaping rolls.

14. Apparatus of the character described comprising a pair of shaping rolls, each having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; an abutment cooperating with the elevations of at least one of said rolls, whereby when such roll is rotated the same will segregate successive quantities of metal from metal delivered thereto and to convey the same through said pass to be shaped by said rolls into a sheet of substantially corrugated configuration; conditioning means for receiving a supply of molten metal, extracting excess heat therefrom to render the same relatively plastic, and delivering the same to said shaping rolls, said conditioning means including a plurality of lower rolls arranged in side-by-side relation, and a plurality of upper rolls arranged in side-by-side relation and spaced from said lower rolls and defining therewith a plurality of chambers communicating with one another through relatively narrow passages and through which the metal passes to said shaping rolls; and means responsive to the temperature of said metal for automatically controlling the speed of rotation of the rolls of said conditioning means.

15. Apparatus of the character described comprising a pair of shaping rolls and conditioning means for receiving a supply of molten metal, rendering the same relatively plastic, and delivering the same to said shaping rolls; said conditioning means including a plurality of lower rolls arranged in side-by-side relation, and a plurality of upper rolls arranged in side-by-side relation and spaced from said lower rolls and defining therewith a plurality of chambers communicating with one another through relatively narrow passages and through which the metal passes to said shaping rolls, certain of the rolls of said conditioning means being provided with radially projecting impeller means for positively feeding the metal toward said shaping rolls.

16. Apparatus of the character described comprising a pair of shaping rolls, each having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; an abutment cooperating with the elevations of at least one of said rolls, whereby when such roll is rotated the same will segregate successive quantities of metal from metal delivered thereto and to convey the same through said pass to be shaped by said rolls into a sheet of substantially corrugated configuration; and conditioning means for receiving a supply of molten metal, rendering the same relatively plastic, and delivering the same to said shaping rolls, said conditioning means including a plurality of lower rolls arranged in side-by-side relation, and a plurality of upper rolls arranged in side-by-side relation and spaced from said lower rolls and defining therewith a plurality of chambers communicating with one another through relatively narrow passages and through which the metal passes to said shaping rolls, certain of the rolls of said conditioning means being provided with radially projecting impeller means for positively feeding the metal toward said shaping rolls.

17. Apparatus of the character described comprising a feeding roll and an idler roll, each of said rolls having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; an abutment cooperating with the elevations of said feeding roll; and conditioning means for receiving a supply of molten metal, reducing the temperature thereof according to a predetermined temperature gradient and delivering the same to said feeding roll, said feeding roll when rotated cooperating with said abutment to segregate successive quantities of the pre-cooled metal delivered thereto and to convey the same through said pass to be shaped by said rolls into a sheet of substantially corrugated configuration.

18. Apparatus of the character described comprising a feeding roll and an idler roll, each of said rolls having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; an abutment cooperating with the elevations of said feeding roll; conditioning means for receiving a supply of molten metal, reducing the temperature thereof according to a predetermined temperature gradient and delivering the same to said feeding roll, said feeding roll when rotated cooperating with said abutment to segregate successive quantities of the pre-cooled metal delivered thereto and to convey the same through said pass to be shaped by said rolls into a sheet of substantially corrugated configuration; and means responsive to the temperature of said metal for controlling the speed of rotation of said rolls.

19. Apparatus of the character described comprising a feeding roll and an idler roll, each of said rolls having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; an abutment cooperating with the elevations of said feeding roll; conditioning means for receiving a supply of molten metal, reducing the temperature thereof according to a predetermined temperature gradient and delivering the same to said feeding roll; and means for excluding atmospheric air from said metal during its passage to said feeding roll, said feeding roll when rotated cooperating with said abutment to segregate successive quantities of the pre-cooled metal delivered thereto and to convey the same through said pass to be shaped by said rolls into a sheet of substantially corrugated configuration.

20. Apparatus for shaping plastic material comprising a feeding roll and an idler roll, each of said rolls having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; and an abutment cooperating with the elevations of said feeding roll, whereby when such roll is rotated the same will segregate successive quantities of material from material delivered thereto and to convey the same through said pass to be shaped by said rolls into a sheet of substantially corrugated configuration.

21. Apparatus for shaping plastic material comprising a feeding roll and an idler roll, each of said rolls having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; an abutment cooperating with the elevations of said feeding roll, whereby when such roll is rotated the same will segregate successive quantities of material from material delivered thereto and to convey the same through said pass to be shaped by said rolls into a sheet of substantially corrugated configuration; and means for moving said feeding roll out of operative relation with said abutment to interrupt the feeding of said material.

22. Apparatus for shaping plastic material comprising a feeding roll and an idler roll, each of said rolls having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; an abutment cooperating with the elevations of said feeding roll, whereby when such roll is rotated the same will segregate successive quantities of material from material delivered thereto and to convey the same through said pass to be shaped by said rolls into a sheet of substantially corrugated configuration; and means for separating said rolls to interrupt the fabrication of the sheet and to provide access therebetween.

23. Apparatus of the character described comprising a feeding roll and an idler roll, each of said rolls having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; an abutment cooperating with the elevations of said feeding roll, whereby when such roll is rotated the same will segregate successive quantities of molten metal from a supply of such metal, reduce the temperature thereof to render the same relatively plastic, and to convey the same through said pass to be shaped by said rolls into a sheet of substantially corrugated configuration; and means responsive to the temperature of said metal for automatically controlling the speed of rotation of said rolls.

24. Apparatus of the character described comprising a feeding roll and an idler roll, each of said rolls having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; an abutment cooperating with the elevations of said feeding roll, whereby when such roll is rotated the same will segregate successive quantities of molten metal from a supply of such metal, reduce the temperature thereof to render the same relatively plastic to convey the same through said pass to be shaped by said rolls into a sheet of substantially corrugated configuration, and thence over said idler roll to be further cooled thereby; and means for projecting a cooling medium against said sheet as it emerges from said pass and while it is supported by said idler roll.

25. Apparatus for shaping plastic material comprising a feeding roll and an idler roll, each of said rolls having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; an abutment cooperating with the elevations of said feeding roll, whereby when such roll is rotated the same will segregate successive quantities of material from material delivered thereto and to convey the same through said pass to be shaped by said rolls into a sheet of substantially corrugated configuration; means for moving at least one of said rolls to an inoperative position; and means for rotating such roll when thus moved.

26. Apparatus for shaping plastic material comprising a receptacle for containing a supply of plastic material; a feeding roll extending into said receptacle and into sealing engagement with a material confining surface thereof; an idler roll cooperating with said feeding roll exteriorly of said receptacle, each of said rolls having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; and means for rotating said rolls to cause said feeding roll in cooperation with said surface to segregate successive quantities of material from said supply and to convey the same upwardly through said pass to be shaped by said rolls into a sheet of substantially corrugated configuration.

27. Apparatus for shaping plastic material comprising a receptacle for containing a supply of plastic material; a feeding roll extending into said receptacle and into sealing engagement with a material confining surface thereof; an idler roll cooperating with said feeding roll exteriorly of said receptacle, each of said rolls having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; means for rotating said rolls to cause said feeding roll in cooperation with said surface to segregate successive quantities of material from said supply and to convey the same upwardly through said pass to be shaped by said rolls into a sheet of substantially corrugated configuration; and means for elevating said feeding roll away from said surface to interrupt the feeding of said material.

28. Apparatus for shaping plastic material comprising a receptacle for containing a supply of plastic material; a feeding roll extending into said receptacle and into sealing engagement with a material confining surface thereof; an idler roll cooperating with said feeding roll exteriorly of said receptacle, each of said rolls having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; means for rotating said rolls to cause said feeding roll in cooperation with said surface to segregate successive quantities of material from said supply and to convey the same upwardly through said pass to be shaped by said rolls into a sheet of substantially corrugated configuration; and means for separating said rolls to interrupt the fabrication of said sheet and to provide access therebetween.

29. Apparatus of the character described comprising a receptacle for containing a supply of molten metal; a feeding roll extending into said receptacle and into sealing engagement with a metal confining surface thereof; an idler roll cooperating with said feeding roll exteriorly of said receptacle, each of said rolls having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; means for rotating said rolls to cause said feeding roll in cooperation with said surface to segregate successive quantities of molten metal from the supply in said receptacle, to reduce the temperature thereof to render the same relatively plastic and to convey the same upwardly through said pass to be shaped by said rolls into a sheet of substantially corrugated configuration; and means responsive to the temperature of said metal for automatically controlling the speed of rotation of said rolls.

30. Apparatus of the character described comprising a receptacle for containing a supply of molten metal; a feeding roll extending into said receptacle and into sealing engagement with a metal confining surface thereof; an idler roll cooperating with said feeding roll exteriorly of said receptacle, each of said rolls having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; means for rotating said rolls to cause said feeding roll in cooperation with said surface to segregate successive quantities of molten metal from the supply in said receptacle, to reduce the temperature thereof to render the same relatively plastic, and to convey the same upwardly through said pass to be shaped by said rolls into a sheet of substantially corrugated configuration, and thence over said idler roll to be further cooled thereby; and means for projecting a cooling medium against said sheet as it emerges from said pass and while it is supported by said idler roll.

31. Apparatus for shaping plastic material comprising a receptacle for containing a supply of plastic material; a feeding roll extending into said receptacle and into sealing engagement with a material confining surface thereof; an idler roll cooperating with said feeding roll exteriorly of said receptacle, each of said rolls having a plurality of circumferentially arranged longitudinally extending elevations and depressions and each being mounted for rotation about horizontal axes with the elevations of one of said rolls disposed in constantly registering spaced relation with the depressions in the other of said rolls and together defining a sheet forming pass; means for rotating said rolls to cause said feeding roll to segregate successive quantities of material from said supply and to convey the same upwardly through said pass to be shaped by said rolls into a sheet of substantially corrugated configuration; means for moving at least one of said rolls to an inoperative position; and means for rotating such roll when thus moved.

MARSHALL LOW.